(12) United States Patent
Mathur

(10) Patent No.: US 11,057,648 B2
(45) Date of Patent: Jul. 6, 2021

(54) LOCALIZED CLOUD SERVICES FOR PRIVACY-ISOLATED CLIENTS

(71) Applicant: DISH Network L.L.C., Englewood, CO (US)

(72) Inventor: Mudit Mathur, Milpitas, CA (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/379,484

(22) Filed: Apr. 9, 2019

(65) Prior Publication Data

US 2020/0329260 A1    Oct. 15, 2020

(51) Int. Cl.
| | |
|---|---|
| *H04N 7/18* | (2006.01) |
| *H04N 21/2187* | (2011.01) |
| *H04N 21/214* | (2011.01) |
| *H04N 21/4147* | (2011.01) |
| *H04N 21/61* | (2011.01) |
| *H04L 29/08* | (2006.01) |

(52) U.S. Cl.
CPC ..... *H04N 21/2187* (2013.01); *H04N 21/2143* (2013.01); *H04N 21/4147* (2013.01); *H04N 21/6125* (2013.01); *H04N 21/6175* (2013.01); *H04L 67/10* (2013.01)

(58) Field of Classification Search
CPC ........................ H04N 21/2143; H04N 21/2187
See application file for complete search history.

(56) References Cited

U.S. PATENT DOCUMENTS

| | | | |
|---|---|---|---|
| 9,473,811 B1* | 10/2016 | Lee ................... | H04N 21/4263 |
| 2004/0250282 A1* | 12/2004 | Bankers .............. | H04N 21/482 |
| | | | 725/58 |
| 2005/0246738 A1* | 11/2005 | Lockett .............. | H04N 21/8547 |
| | | | 725/43 |
| 2008/0244677 A1* | 10/2008 | Yamamoto ............ | H04H 60/27 |
| | | | 725/116 |
| 2009/0165049 A1* | 6/2009 | Sekiguchi ........ | H04N 21/25841 |
| | | | 725/39 |
| 2011/0197224 A1* | 8/2011 | Meijer ................... | H04H 60/46 |
| | | | 725/34 |
| 2011/0314497 A1* | 12/2011 | Warrick ............. | H04N 21/6125 |
| | | | 725/38 |
| 2014/0033236 A1 | 1/2014 | Guzman et al. | |
| 2017/0195698 A1* | 7/2017 | Patrick ............. | H04N 21/25833 |
| 2017/0238031 A1 | 8/2017 | Warrick et al. | |
| 2017/0264956 A1* | 9/2017 | Gerhards ........... | H04N 21/6587 |

OTHER PUBLICATIONS

International Search Report and Written Opinion for PCT/US2020/023650 dated Jun. 2, 2020, all pages.

* cited by examiner

*Primary Examiner* — Gigi L Dubasky (74) *Attorney, Agent, or Firm* — Kilpatrick Townsend & Stockton LLP (57) ABSTRACT

Various arrangements of a local cloud system for providing television services are presented. A facility cloud host system may have a content service provider interface that is used to receive live television channel streams from a television content service provider. The local cloud system may have a transcoder that transcodes the live television channels into a format to be transmitted locally to client devices. The local cloud system may have a property management system interface through which temporary user information is imported for accounts linked to the client devices. The local cloud system may provide digital video recorder (DVR) services for the accounts mapped to the client devices.

19 Claims, 6 Drawing Sheets

LOCALIZED CLOUD SERVICES FOR PRIVACY-ISOLATED CLIENTS

BACKGROUND

In a typical hotel room, a set top box (STB) connected with a television or a television receiver integrated with the television can allow a room occupant to browse through the television channels available through the hotel's subscription. A limited number of services may be available through the STB or integrated television receiver, such as an electronic programming guide (EPG) and pay-per-view (PPV) programming. Notably, services that a user may be accustomed to having at home may not be available, such as the ability to record television programming or have access to on-demand content.

SUMMARY

Various embodiments are described related to a local cloud system for providing television services. In some embodiments, a system related to a local cloud system for providing television services is described. The system may include a facility cloud host system. The facility cloud host system may include a content service provider interface that may be used to receive a plurality of live television channel streams from a television content service provider. The facility cloud host system may include a plurality of tuners. Each tuner of the plurality of tuners may receive one or more live television channel streams of the plurality of live television channel streams. The facility cloud host system may include a transcoder that may transcode the one or more live television channels into a format to be transmitted locally to one or more client devices of a plurality of client devices. Each client device may be mapped to a subaccount of a plurality of subaccounts. The facility cloud host system and the plurality of client devices may be located at a common facility. The facility cloud host system may include a property management system interface through which temporary user information may be imported for each sub-account of the plurality of subaccounts. The temporary user information may be indicative of an end time that may be temporarily mapped to the subaccount. The facility cloud host system may include a digital video recorder (DVR) that may provide content recording services for the plurality of subaccounts mapped to the plurality of client devices.

Embodiments of such a system may include one or more of the following features: the facility cloud host system may receive a command to record an instance of content from the plurality of live television channel streams by the DVR in association with a subaccount of the plurality of subaccounts. The facility cloud host system may permit access to the instance of content recorded for the subaccount until the end time of the temporary user information may be reached. The temporary user information may be indicative of a time period of a room reservation and a name of a person mapped to the room reservation. The facility cloud host system may further include a satellite antenna that may be connected with the content service provider interface to receive the plurality of live television channel streams. The facility cloud host system may further include an over-the-air (OTA) interface that may receive one or more locally-broadcast OTA television channels. The transcoder may convert the one or more locally-broadcast OTA television channels into the format to be transmitted locally to one or more client devices of the plurality of client devices. The local cloud system may include the plurality of client devices. Each client device of the plurality of client devices may have an installed application that communicates with the facility cloud host system. The local cloud system may include the plurality of client devices. Each client device of the plurality of client devices may be a set top box that may perform bidirectional communication with the facility cloud host system. The facility cloud host system may be installed at a hotel and the plurality of client devices may be installed in hotel rooms of the hotel. The facility cloud host system may further include a client interface that may perform bidirectional communication via an IP network with the plurality of client devices. The local cloud system may further include a master cloud host that may be accessible via the Internet by the facility cloud host system. The facility cloud host system may retrieve content for a user from the master cloud host based on the user providing the facility cloud host system with master cloud host credentials via a client device of the plurality of client devices. The local cloud system may further include a property management system that tracks an end date of room reservations. The plurality of client devices may be located in a plurality of rooms tracked by the property management system.

In some embodiments, a method for using a local cloud system is described. The method may include obtaining, by a facility cloud host system, from a property management system, temporary user account information to be linked with a sub-account. The method may include receiving, using a plurality of tuners, a plurality of television channels. The method may include transcoding the plurality of television channels into a format for transmission over a packet-based network to a plurality of client devices. The facility cloud host system and the plurality of client devices may be located at a common facility. The method may include receiving, from a client device of the plurality of client devices, a definition of a digital video recorder (DVR) timer linked with the sub-account. The method may include performing, by the facility cloud host system, recording of a live television channel stream based on the timer. The method may include providing access to the recording of the live television channel stream for the sub-account for a time period defined based at least in part on the temporary user account information.

Embodiments of such a method may include one or more of the following features: the temporary user information may be indicative of the time period of a room reservation and a name of a person mapped to the room reservation. Receiving the plurality of television channels may include receiving at least one television channel via an over-the-air (OTA) antenna. Receiving the plurality of television channels may include receiving at least one television channel via a satellite antenna. The definition of the DVR timer may be received from a smart television executing an application that may be configured to communicate with the facility cloud host system. The facility cloud host system may be installed at a hotel and the plurality of client devices may be installed in hotel rooms of the hotel. The method may include retrieving, by the facility cloud host system, data from a master cloud system via the Internet based on credentials of a user of the client device. The data may be selected from the group consisting of: previously-recorded DVR content; user preferences; and previously-defined DVR timers. The method may include mirroring, by the facility cloud host system, data stored at a master cloud system such that the data may be additionally available at the facility cloud host system. The method may further include performing, by the facility cloud host system, a plurality of recordings of a plurality of live television channel streams based on a plurality of timers defined by a television service provider.

DETAILED DESCRIPTION

In various situations, a single television service account with a content provider may be used to provide television services to many unrelated parties. Examples can include hotels, motels, dormitories, resorts, cruise ships, etc. In such situations, the owner or manager may purchase television services for the rooms of their facility which are then used by visitors on a temporary basis. Typically, a person renting a hotel room would be permitted to use television services within his room during his stay at the hotel.

Such an arrangement may differ from a conventional residential arrangement in multiple ways. First, privacy must be maintained among the various client devices used by different users. While in a residential setting, a single household account may allow content and settings to be shared among multiple television receiver devices, in a facility such sharing of data could result in privacy issues. Second, a headend system may be used to distribute television services to many more client devices than in a residential home; for instance, a headend system may deliver television services to hundreds of client devices in hundreds of separate rooms. Due to cost and logistics, services that are typically present in a residential environment may not be offered, such as DVR services. The cost of implementing and maintaining client devices having incorporated DVRs in each room may be daunting. Further, for privacy reasons, it may be necessary to delete content that has been recorded by an occupant on checkout.

As detailed herein, a local cloud for the facility can be established. A local cloud server system may reside onsite at the facility (e.g., hotel, cruise ship, dormitory). This local cloud server system may receive live streaming television channels from one or more sources (e.g., satellite, over-the-air) and stream these live television channels to client devices. Such client devices may be devices dedicated to the task, such as STBs or may be an application that is stored and executed by a smart television, thus eliminating the need for a dedicated client device.

The local cloud server system may communicate with a property management system (PMS). For a facility such as a hotel, the PMS may store data related to when a person is checking in and checking out. This data from the PMS may be used to centrally manage DVR services at the local cloud server system. For instance, content recorded based on a command from a hotel guest may be removed from access based on when the guest's reservation ends.

The local cloud server system may also perform content insertion. For example, the content service provider may have the right to insert various pieces of content (such as an advertisement) in the live television channel streams. The local cloud server system may be able to retrieve and insert content into the live television channel streams. In some embodiments, the content may be selected based on data particular to the user, such as determined from the PMS.

Figure 1A:
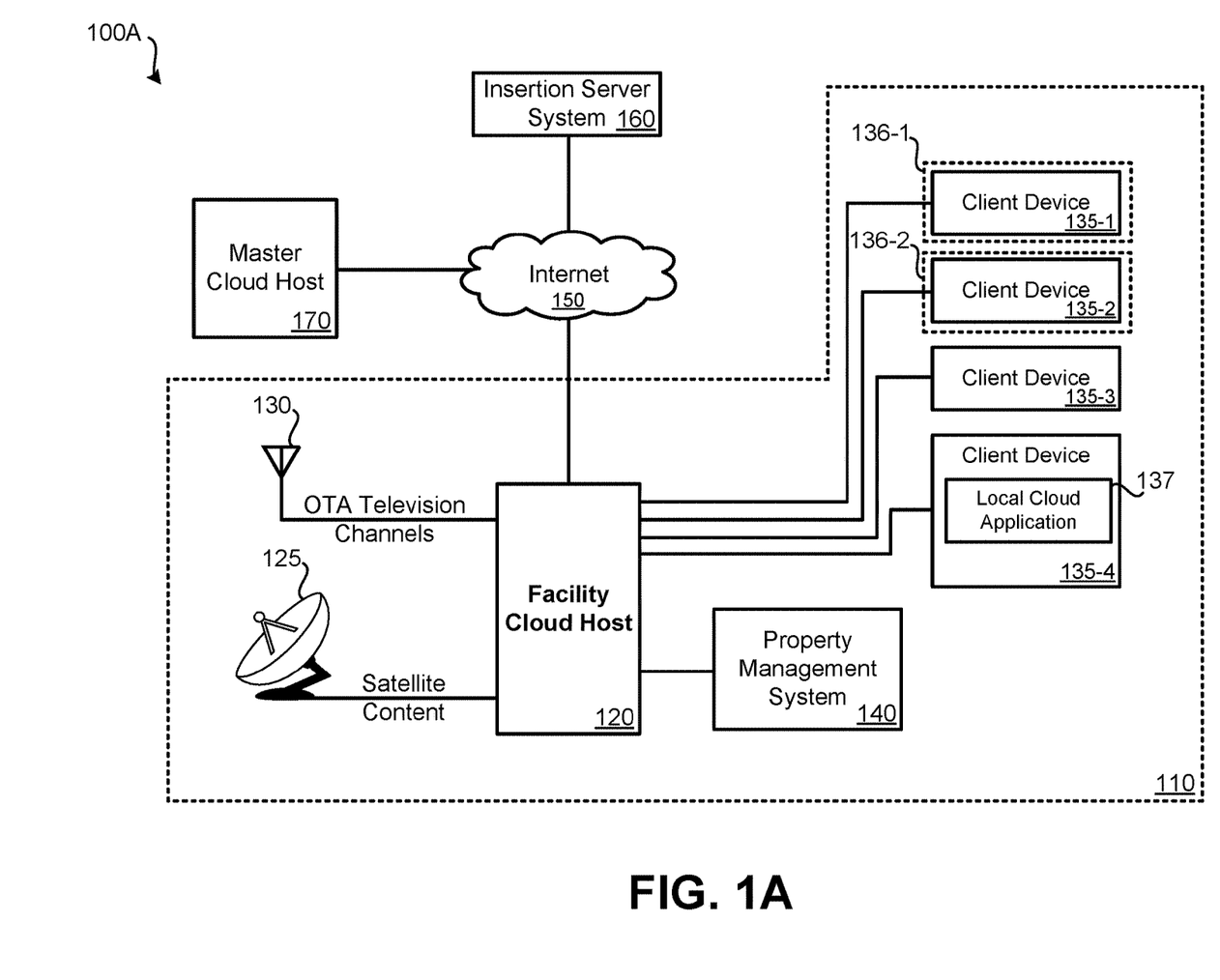
FIG. 1A illustrates an embodiment of a local cloud system that provides television programming services to multiple client devices.

Further detail regarding these and other embodiments is provided in relation to the figures. FIG. 1A illustrates an embodiment of a cloud environment 100A that provides television programming services to multiple client devices. Cloud environment 100A may include a local cloud system that is located at facility location 110, which can include: facility cloud host 120; satellite antenna 125; over-the-air (OTA) antenna 130; client devices 135; and property management system (PMS) 140. Cloud environment 100A may further include Internet 150; insertion server system 160; and master cloud host 170.

The local cloud system and its components may be installed at a facility location 110 for which local cloud services are to be provided. The operator of the facility may be responsible for providing television services to multiple client devices that will be operated by different users. The users may be required to be treated as separate entities, therefore, privacy among the individual users may be required to be maintained. Examples of such a facility may be a hotel, motel, dormitory, short-term residence facility, resort, cruise ship, cruise liner, or another form of ocean going vessel. As a specific example, on a cruise ship, each berth or room may have a television. The operator of the ship can provide television services to the television. The services provided to this television should remain private such that other users are not made aware of the actions taken by the user with respect to the television. Similarly, at a hotel, each room may have a television. The hotel operator can provide television services to the television. Again here, the services provided to this television should remain private such that other guests of the hotel are not made aware of the actions taken by the user with respect to the television in his room.

At the facility location may be facility cloud host 120. Facility cloud host 120 may receive television services from one or more sources, such as satellite antenna 125 and/or OTA antenna 130. Streams of live television channels may be distributed on demand to client devices 135 in response to a request or sent as a multicast that any client device of client devices 135 can access. Facility cloud host 120 may communicate with the Internet 150 (and/or other public or private networks). Such a network connection may allow facility cloud host 120 to communicate with insertion server system 160 and/or master cloud host 170. Facility cloud host 120 may also communicate with PMS 140, which is co-located at facility location 110 and client devices 135, which are co-located at facility location 110. Further detail regarding facility cloud host 120 is provided in relation to FIG. 2.

OTA antenna 130 may receive local television channels that are broadcast using VHF and/or UHF and are free to access using an aerial antenna. OTA antenna 130 may allow facility cloud host 120 to receive live streams of television channels that are broadcast locally. For instance, local affiliates of NBC, ABC, CBS, and FOX typically broadcast television channels. By receiving OTA channels, facility cloud host 120 may be able to access local programming (e.g., local news, local weather alerts) that would not be accessible via satellite. OTA antenna 130 may be installed at facility location 110 at a location that allows OTA antenna 130 to receive the locally-broadcast television channels. Satellite antenna 125 may allow facility cloud host 120 to receive television channels and other content transmitted via satellite by a satellite television service provider. Such a service may be on a subscription basis. The satellite television service provider may provide credentials to facility cloud host 120 that allows for received streams of television channels to be decrypted and/or decoded. Streams of television channels may be distributed by facility cloud host 120 such that whether the television channel was received from OTA antenna 130 or satellite antenna 125 is indistinguishable to a user of a client device of client devices 135. While the local cloud system at facility location 110 includes satellite antenna 125 and OTA antenna 130, it should be understood that content may be additionally or alternatively received from other sources. For instance, a cable-based or IP-based network may provide streams of television channels to facility cloud host 120.

Facility cloud host 120 may communicate with multiple client devices 135. As illustrated in FIG. 1A, four client devices (135-1, 135-2, 135-3, and 135-4) are present. This number of client devices is for illustration purposes only; fewer or greater numbers of client devices 135 may be present in other embodiments. For example, at a hotel or on a cruise ship, hundreds of client devices 135 may be present. Each client device of client devices 135 may be located in a different room or other form of location. For example, client device 135-1 is located in room 136-1 while client device 135-2 is located in hotel room 136-2. Privacy among such client devices may be required to be maintained such that a user of one client device is unaware of the actions of a user of another client device. Such privacy can include: not being aware of what other users are viewing; not being aware or having access to DVR timers or previously recorded DVR content of another user; not being able to view account details or account information of other users. Such privacy may need to be maintained among not only concurrent users of different client devices, but also subsequent users of the same client device. For example, client device 135-1 may be located in a hotel room. Privacy may be required to be maintained such that a second hotel guest renting a room after a first hotel guest cannot access any information considered private about the first hotel guest (e.g., what the first hotel guest recorded using a DVR).

Each client device of client devices 135 may represent an interface device that receives content and outputs to a television, such as an STB. Such an STB may be a "thin client." DVR services may be performed remotely from the STB. The STB may be able to convert received data (e.g., data packets) from a format appropriate for transmission to the client device and into a format appropriate for output. The STB may further receive commands from a user and output the command to facility cloud host 120. Facility cloud host 120 and client devices 135 may use some form of a network, such as an IP-based Ethernet or EOC (Ethernet over coaxial cable) network, to perform bidirectional communication. Such STBs may include one or more special-purpose or general-purpose processors. Such special-purpose processors may include processors that are specifically designed to perform the functions detailed herein; that is, interacting with facility cloud host 120. Such special-purpose processors may be ASICs or FPGAs which are general-purpose components that are physically and electrically configured to perform the functions detailed herein. Such general-purpose processors may execute special-purpose software, such as an installed application, that is stored using one or more non-transitory processor-readable mediums, such as random access memory (RAM), flash memory, a hard disk drive (HDD), or a solid state drive (SSD). Such an installed application may be programmed to directly access facility cloud host 120 for cloud-based services (rather than, for example, accessing master cloud host 170).

Additionally or alternatively, some or all of client devices 135 may be a television itself, such as a "smart TV," that is capable of executing an installed application. Client device 135-4 illustrates an example of a smart TV on which local cloud application 137 has been installed. Client device 135-4 may be programmed to execute local cloud application 137 on startup such that television services are always provided via local cloud application 137. Similar to the previously detailed STBs, Smart TVs may include one or more special-purpose or general-purpose processors. Such special-purpose processors may include processors that are specifically designed to perform the functions detailed herein; that is, interacting with facility cloud host 120. Such special-purpose processors may be ASICs or FPGAs which are general-purpose components that are physically and electrically configured to perform the functions detailed herein. Such general-purpose processors may execute special-purpose software, such as an installed application, that is stored using one or more non-transitory processor-readable mediums, such as RAM, flash memory, a HDD, or a SSD. Such an installed application may be programmed to directly access facility cloud host 120 for cloud-based services (rather than, for example, accessing master cloud host 170).

Each of client devices 135 may be mapped to a sub-account. Each sub-account may not vary based on the current user or occupant of the room in which the client device is installed. Rather, data stored in relation to the sub-account may be cleared based on a user's reservation for the room. Facility cloud host 120 may communicate with PMS 140 to obtain temporary user information. PMS 140 may provide facility cloud host 120 with details regarding a user's reservation for a particular room as part of a set of temporary user data or temporary user information. For instance, PMS 140 may notify facility cloud host 120 with data that indicates: a sub-account (or identifier that can be used to determine the sub-account, such as room number); a check-in date/time; a check-out date/time; a customer loyalty number; and/or a name of the user. In some embodiments, more data about the user may be available and obtained from PMS 140, such as: income range; number of yearly stays at the facility; age range; sex; permanent address; or other biographical information. In some embodiments, facility cloud host 120 receives a daily batch transfer of such data from PMS 140; in other embodiments, as new data is available at PMS 140, it is pushed to facility cloud host 120. In still other embodiments, facility cloud host 120 may request and receive such data from PMS 140. PMS 140 may be in the form of a server system located locally at facility location 110; in other embodiments, a cloud-based PMS may be used that is accessible via Internet 150 or some other public or private network.

Insertion server system 160 may provide content, such as advertisements, that are appropriate to be inserted into streams of live television channels or content streamed locally by facility cloud host 120. For example, a satellite television service provider that provides live streaming television channels through satellite antenna 125 may have the right to various commercial slots on various live television channels. Facility cloud host 120 may monitor received streams of television channels (e.g., from satellite antenna 125 and/or OTA antenna 130) for metadata markers indicating such slots (the metadata may additionally indicate the duration of such slots) within the live television channel streams where facility cloud host 120 has permission to substitute different content. Facility cloud host 120 may obtain alternate content from insertion server system 160 and insert such content into the permitted slots. For instance, facility cloud host 120 may use data obtained from PMS 140 to retrieve content targeted to a specific user (e.g., based on the user's biographical information) from insertion server system 160. This content may then be inserted into an appropriate slot into the received stream of a live television channel being relayed to the client device being used by the user. From the user's point-of-view, it may not be obvious or indicated that the content has been selected and inserted based on the characteristics of the user.

Master cloud host 170 may represent a remote cloud-based server system that provides cloud services for many end user accounts. Each end user account may have access to various television channels (which can differ from the television channels available to be streamed through facility cloud host 120), have various DVR timers set, have various instances of content recorded, and have defined user preferences (e.g., defined favorite channels, shortcut buttons for a remote control, etc.) A user staying in room 136-1 may have an end user account with master cloud host 170. Via client device 135-1, the user may be permitted to supply log-in credentials (e.g., a username and password) for master cloud host 170 to facility cloud host 120. These credentials may be used by facility cloud host 120 to access master cloud host 170 and retrieve data relevant to the user. For instance, timers for content to be recorded may be retrieved, permission to access television channels in addition to what is offered by facility cloud host 120 may be obtained, instances of previously-recorded content may be obtained, permission to access previously-purchased PPV programming may be obtained, and user preferences may be obtained. Therefore, data relevant to the user from master cloud host 170 can be obtained to customize and improve the user's viewing experience through the relevant client device during a time period when the sub-account of the client device is associated with the end user as indicated by PMS 140.

In some embodiments, facility cloud host 120 may mirror data hosted by master cloud host 170. That is, periodically or occasionally, facility cloud host 120 may be synchronized with master mast cloud host 170 such that the same (or a subset) of data hosted by master cloud host 170 is hosted by facility cloud host 120. This data can include on-demand content, user preferences, stored timers, DVR content, etc.

Figure 1B:
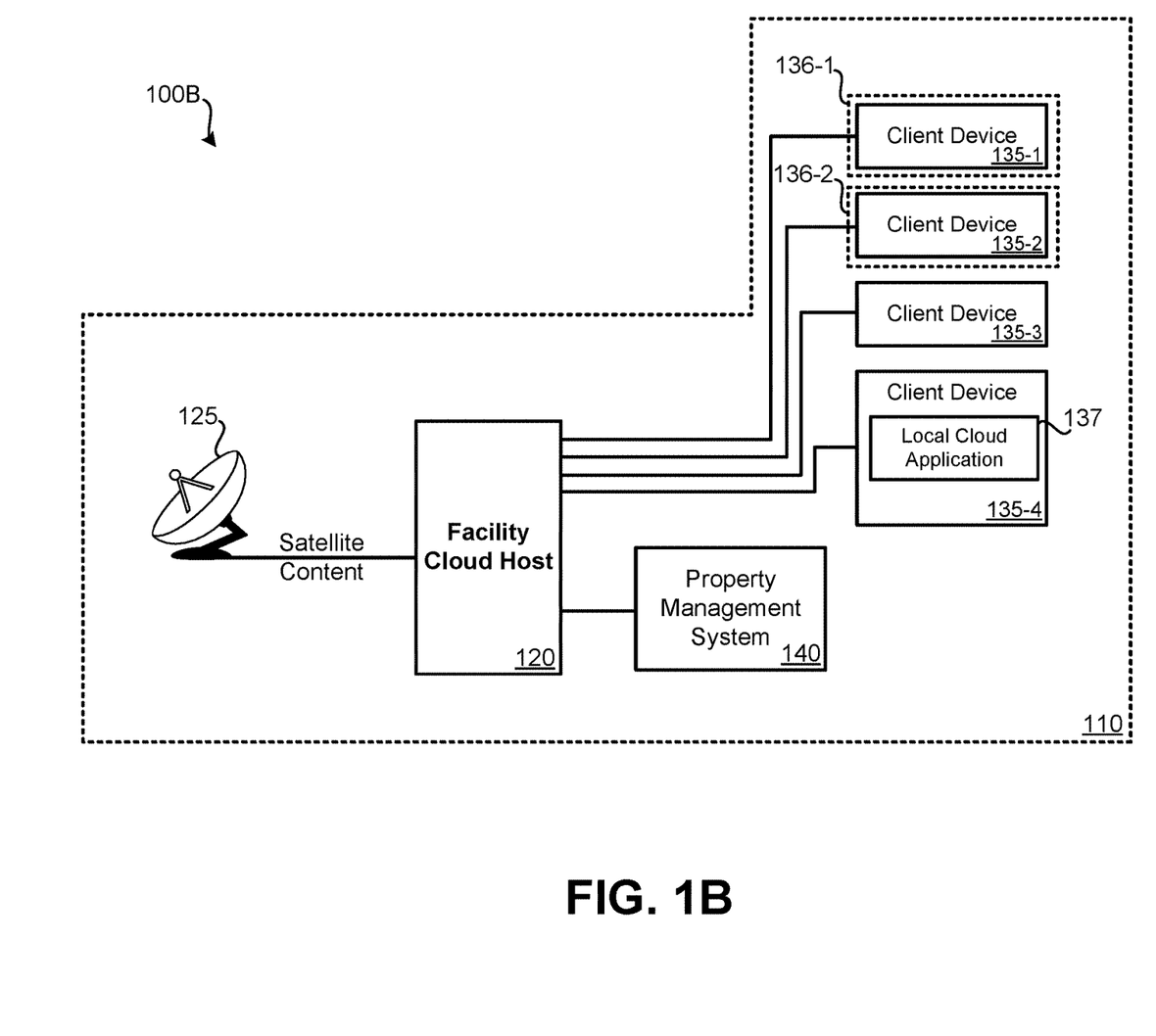
FIG. 1B illustrates another embodiment of a local cloud system that provides television programming services to multiple client devices.

FIG. 1B illustrates another embodiment of an exclusively local cloud system 100B that provides television programming services to multiple client devices. In contrast to cloud environment 100A, exclusively local cloud system 100B may not have a connection with the Internet or other form of external public or private network. Rather, unidirectional data may be received via satellite antenna 125 by facility cloud host 120. Data may also be received from PMS 140. Local cloud system 100B may be used at a facility where access to external networks is impossible, difficult, or expensive, such as at sea (e.g., on a cruise ship). While in port, local cloud system 100B may be in communication with the Internet and may function similarly to cloud environment 100A; however, while at sea, streaming television channels may only be received via satellite antenna 125. Client devices 135, PMS 140, and facility cloud host 120 may function as detailed in relation to FIG. 1A. However, communication between facility cloud host 120 and master cloud host 170 may not be possible when a connection between facility cloud host 120 and the Internet 150 is not available.

Figure 2:
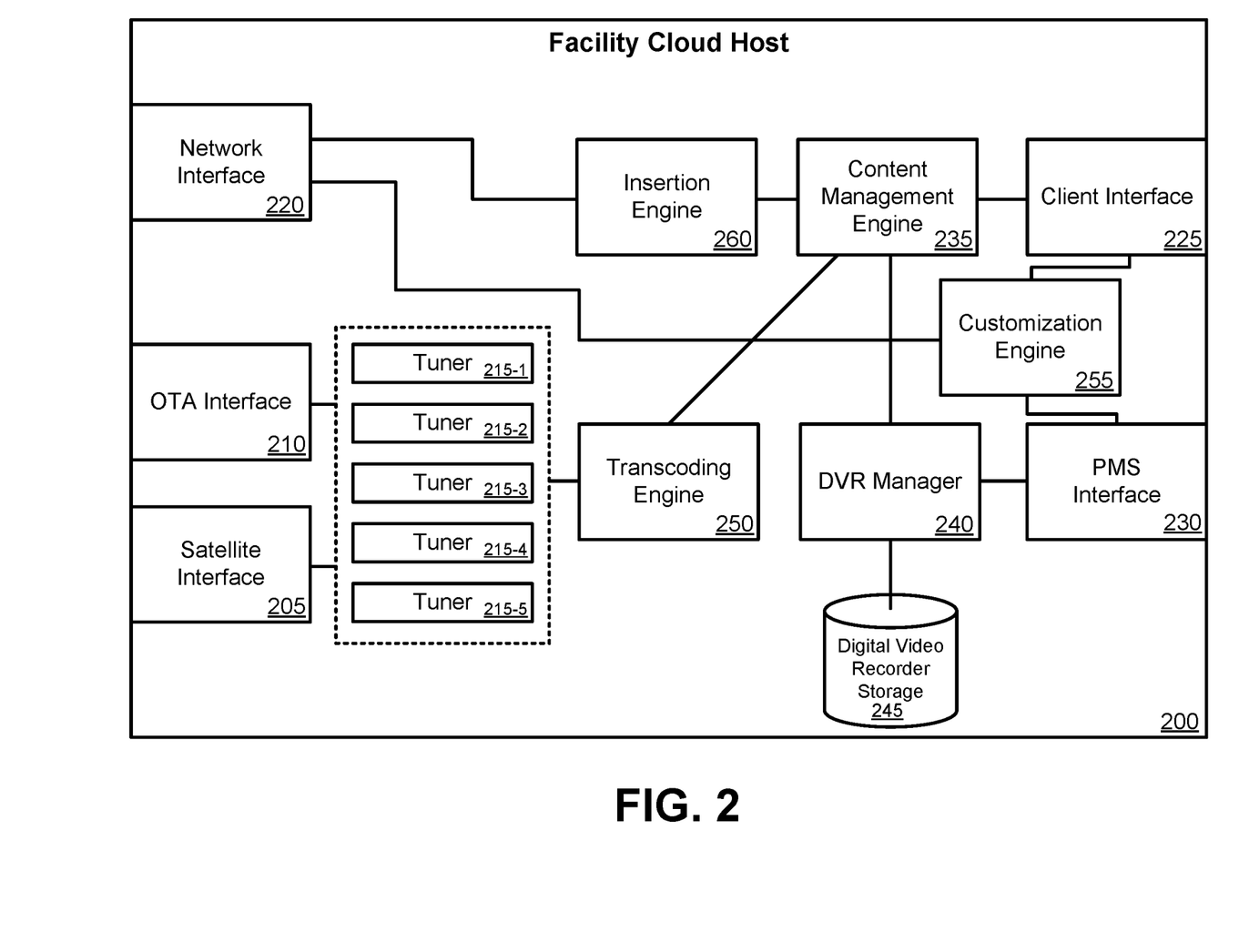
FIG. 2 illustrates an embodiment of a facility cloud host system.

FIG. 2 illustrates an embodiment of facility cloud host 200. Facility cloud host 200 can represent a detailed embodiment of facility cloud host 120 of FIGS. 1A and 1B. Various components of facility cloud host 200 are illustrated in FIG. 2. Such components may be combined together or subdivided in multiple components. Facility cloud host 200 may be one or more server systems. Such server systems may use various computerized parts, such as communication buses, non-transitory storage mediums, processors, software, and communication interfaces. The components of facility cloud host 200 may be performed using one or more processors, which may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as RAM, flash memory, a HDD, or a SSD.

OTA interface 210 may serve to receive streams of one or more broadcast television channels that are received on the VHF or UHF via OTA antenna 130. One or more of tuners 215 may be used to receive the one or more OTA television channels. Such OTA television channels may be continuously transcoded by transcoding engine 250 or may only be transcoded when a client has requested the television channel be streamed to the client device or be recorded. Similarly, satellite interface 205 may serve to receive streams of one or more television channels that are relayed via satellite to satellite antenna 125. One or more of tuners 215 may be used to receive the one or more satellite television channels. Such television channels may be continuously transcoded by transcoding engine 250 or may only be transcoded when a client has requested the television channel be streamed to the client device or be recorded.

Tuners 215 (e.g., 215-1, 215-2, 215-3, 215-4, 215-5) may be used to decode a broadcast (either via satellite, cable, or over the air) television content into a format that is appropriate for further processing by facility cloud host 200. All available television channels may be continuously received and decoded using tuners 215 to reduce the amount of time necessary to output a television channel stream when requested by a client device. Different types of tuners may be in communication with OTA interface 210 and satellite interface 205. The total number of tuners 215 may vary depending on the number of television channels which facility cloud host 200 is capable of simultaneously decoding.

Transcoding engine 250 may serve to transcode television content from formats in which the content is received from tuners 215 to a format that is appropriate for editing, storage, and transmission via a network (e.g., Ethernet, EOC) to one or more client devices, such as into a compressed, packet-based protocol. In some embodiments, transcoding engine 250 continually transcodes every channel output by tuners 215; in other embodiments, only channels that have been specifically requested by client devices are transcoded by transcoding engine 250. While transcoding engine 250 is shown in FIG. 2 as receiving the output of tuners 215, it should be understood that in other embodiments, the order of components may be different. For example, content management engine 235 may process received content before transcoding engine 250.

In some embodiments, content management engine 235 receives the output transcoded television channels from transcoding engine 250. Content management engine 235 may receive commands from client devices via client interface 225 and the network with which client interface 225 is connected. Content management engine 235 may control whether television channels received from transcoding engine 250 are stored by DVR manager 240, streamed live to one or more requesting client devices, or both. Content management engine 235 may further control access to DVR manager 240, allowing a user to access stored content currently associated with his client device's sub-account. DVR content associated with other sub-accounts may not be accessible from the client device's sub-account. In some embodiments, various instances of DVR content are "public," meaning any client device can access. For example, the facility may maintain a set of movies, documentaries, and/or promotional videos that can be accessed from any client device, regardless of the sub-account of the client device.

Content management engine 235 may monitor for markers in live and DVR content that is being output for streaming to a client device. When an ad insertion marker is identified, content management engine 235 may pass this information to insertion engine 260. Insertion engine 260 may determine a length of time available for insertion of content, such as a television commercial. Insertion engine may retrieve details on the user currently associated with the sub-account of the client device to which the content is being streamed. Insertion engine 260 may obtain biographical characteristics about the user (e.g., as part of a set of temporary user data), such as from content management engine 235 or PMS interface 230. Insertion engine 260 may retrieve an instance of content appropriate to insert from insertion server system 160 or a locally-stored repository of insertion content (not pictured). Insertion engine 260 may transmit the biographical data about the user such that insertion server system 160 can select content that corresponds to the biographical data. Alternatively, insertion server system 160 may provide multiple instances of content, from which insertion engine 260 may select a piece of content to insert based on the biographical data.

DVR manager 240 may receive indications of time periods and television channels (referred to, collectively, as a "timer") to record in accordance with particular end user accounts from content management engine 235. DVR manager 240 may store such timers and perform recording based on such timers. Timers may only be permitted if the timer defines a date/time that falls within a time period which the user is associated with the sub-account based on data obtained from PMS interface 230. Content may be recorded to DVR storage 245, which may be present on one or more non-transitory processor readable mediums. Recorded content may be stored such that it is mapped to the subaccount that provided the timer. Only the client device associated with this sub-account can request playback of the associated recorded content. The recorded content may be erased when DVR manager 240 determines that an end time (e.g., of the user's reservation) associated with the sub-account has been reached. Therefore, any content recorded by a user in his room may be deleted on his check-out from the hotel, resort, or other form of facility.

Since timers to record content are set for individual client devices associated with separate sub-accounts, it may be possible that multiple timers are set to record the same instance of a live streaming television channel. DVR manager 240 may have a set of rules stored locally that defines whether separate instances of the content are required (e.g., for legal or contractual reasons) to be stored or if a single instance of the content may be stored to DVR storage 245 and mapped to the multiple sub-accounts. In some embodiments, if a user records a piece of content using a timer to DVR storage 245, rather than the instance of content only being available via the sub-account and associated client device, the content may be made generally available to all sub-accounts and associated client devices. In such an arrangement, other client devices may not be able to determine which sub-account initiated the recording. In such embodiments, the content may be deleted or otherwise removed from availability for playback on a set schedule (e.g., a fixed time after recording, such as one week) or may be deleted or otherwise removed from availability for playback based on the user's date/time of checkout or some other end time indicated in association with the sub-account from PMS interface 230.

DVR manager 240 may receive requests from content management engine 235 to store on-demand content that is public and can be retrieved from any client device. Such public on-demand content may be transmitted by the satellite-based television service provided and indicated as content that is to be stored locally for on-demand playback. An expiration time/date of when such content is to be deleted or otherwise made unavailable may be included with the data transmission. Such public on-demand content may be recorded to DVR storage 245 and may be requested by any client device.

DVR manager 240 may further have stored instructions that trigger recording of one or more television channels, at predefined periods of time for recording to DVR storage 245 and to be made available for all sub-accounts. The instruction to record these channels may be received from the satellite television service provider via satellite interface 205. The channels to be recorded may be received via OTA interface 210, satellite interface 205, or some combination thereof. For example, in one possible arrangement, "prime time" television, such as 7 PM-11 PM, is recorded Monday through Friday, for the major television networks (e.g., ABC, NBC, CBS, FOX, PBS) to DVR storage 245. For a defined period of time, such as the following two weeks, any sub-account can request playback of such recorded content.

Client interface 225 may serve to perform bidirectional communication with the network with which each client device is connected. Similarly, PMS interface 230 may communicate with PMS 140. In some embodiments, PMS interface 230 and network interface 220 may be a same interface and content management engine 235 may receive and process PMS information.

Customization engine 255 may receive credentials from a client device associated with a sub-account. These credentials may be provided by a user of the client device. The credentials may correspond to an account the user holds with master cloud host 170. Upon receipt, customization engine 255 may route the credentials to master cloud host 170 via network interface 220. If the credentials are valid, access to data associated with the user's account with master cloud host 170 may be granted. This can involve: account preferences that can be imported to facility cloud host 200; access to DVR content recorded by the user to master cloud host 170; access to alternate or additional television channels through the user's master cloud host account; and/or access to additional streaming content through master cloud host 170.

Figure 3:
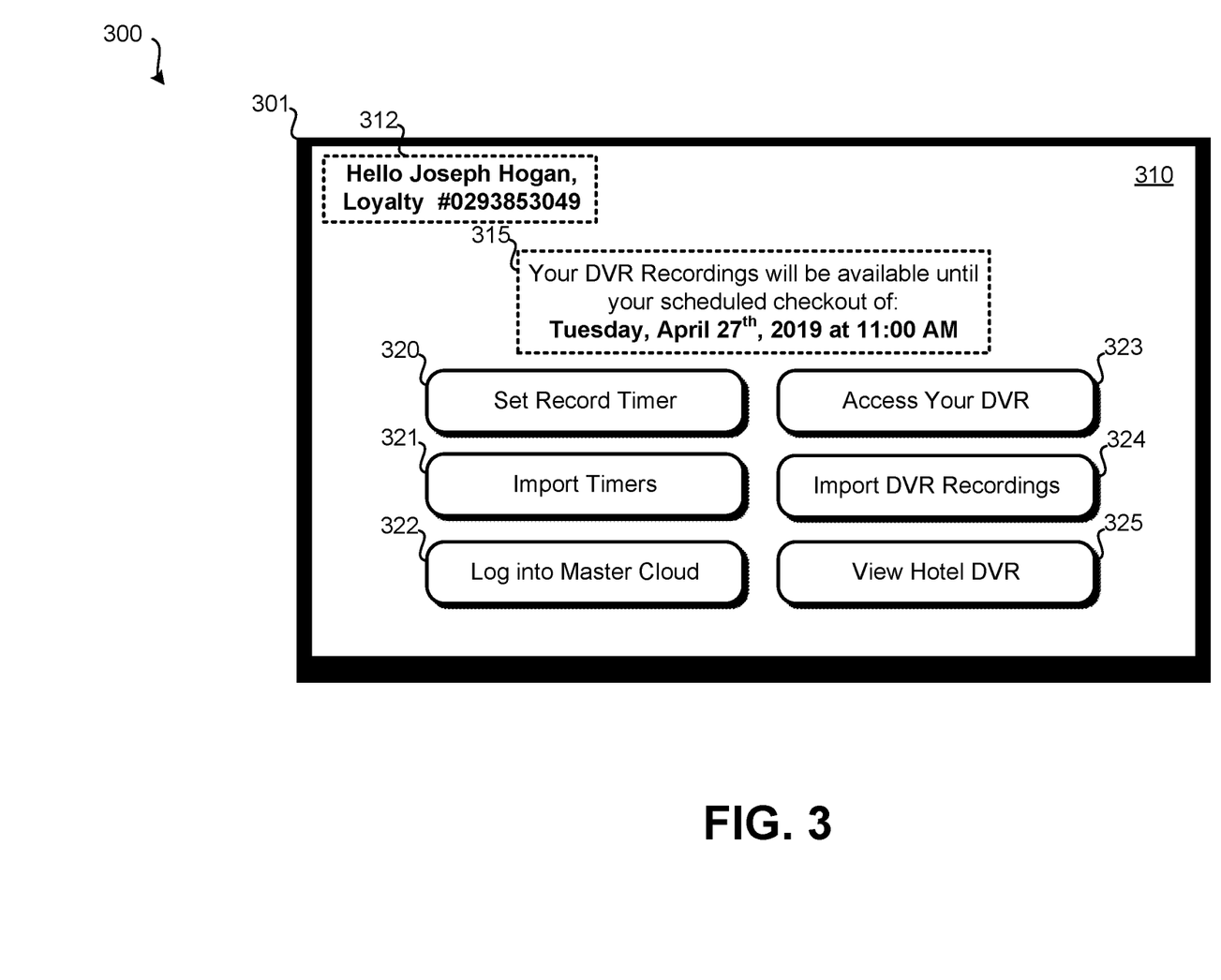
FIG. 3 illustrates an embodiment of an interface output by a client device to facilitate user interaction with the facility cloud host system.

FIG. 3 illustrates an embodiment 300 of an interface 310 output by a client device to facilitate user interaction with the facility cloud host system. In embodiment 300, smart television 301 is functioning as the client device and is executing an application that outputs interface 310 for presentation. In other embodiments, a separate thin client (e.g., STB) may function as the client device and may output interface 310 to a television for presentation. Interface 310 represents an example embodiment, the location, number, and graphical arrangement of elements of interface 310 may vary by embodiment.

On interface 310, two instances of data received by facility cloud host from PMS 140 are presented. Identity element 312 indicates the user's name and facility loyalty number. This user is currently linked with the sub-account of the client device (e.g., smart television 301). End time element 315 indicates when the user's DVR recordings will cease being available (e.g., when they are deleted). The date and time selected may be based on a check-out time from the facility determined based on data linked to the user or sub-account by PMS 140.

Interface 310 may include various elements with which a user can interact. Such elements can include: record timer element 320; import timer element 321; master cloud element 322; DVR element 323; import DVR element 324; and facility DVR element 325. Set record timer element 320 may allow a user to select a television program from an electronic programming guide (EPG) interface for recording. This program may be recorded if it is scheduled to be broadcast prior to the date/time indicated in element 315. Otherwise, the user may be provided with an error message indicating that the recording is after the user's scheduled check-out time. In other embodiments, the date/time of element 315 does not serve as an impediment to the user setting a time via record timer element 320. Import timer element 321 may allow a user to obtain her previously set timers from her master cloud account. To do so, the user may first be required to log into her master cloud account via master cloud element 322. Similarly, import DVR element 324 may allow a user to access or download her previously recorded instances of content from her master cloud account. Again here, the user may first be required to log into her master cloud account via master cloud element 322.

DVR element 323 may allow a user to access DVR recordings that the user recorded via record timer element 320 and/or import timer element 321. These instances of DVR content may only be available until the date/time indicated in element 315. Facility DVR element 325 may allow the user to use the client device to access public instances of on-demand content. Such content may have been transmitted to the facility cloud host for use as on-demand content or may have been recorded by the facility cloud host based on a timer, which may have been provided to the facility cloud host by the television service provider (e.g., satellite-based television service provider).

Figure 4:
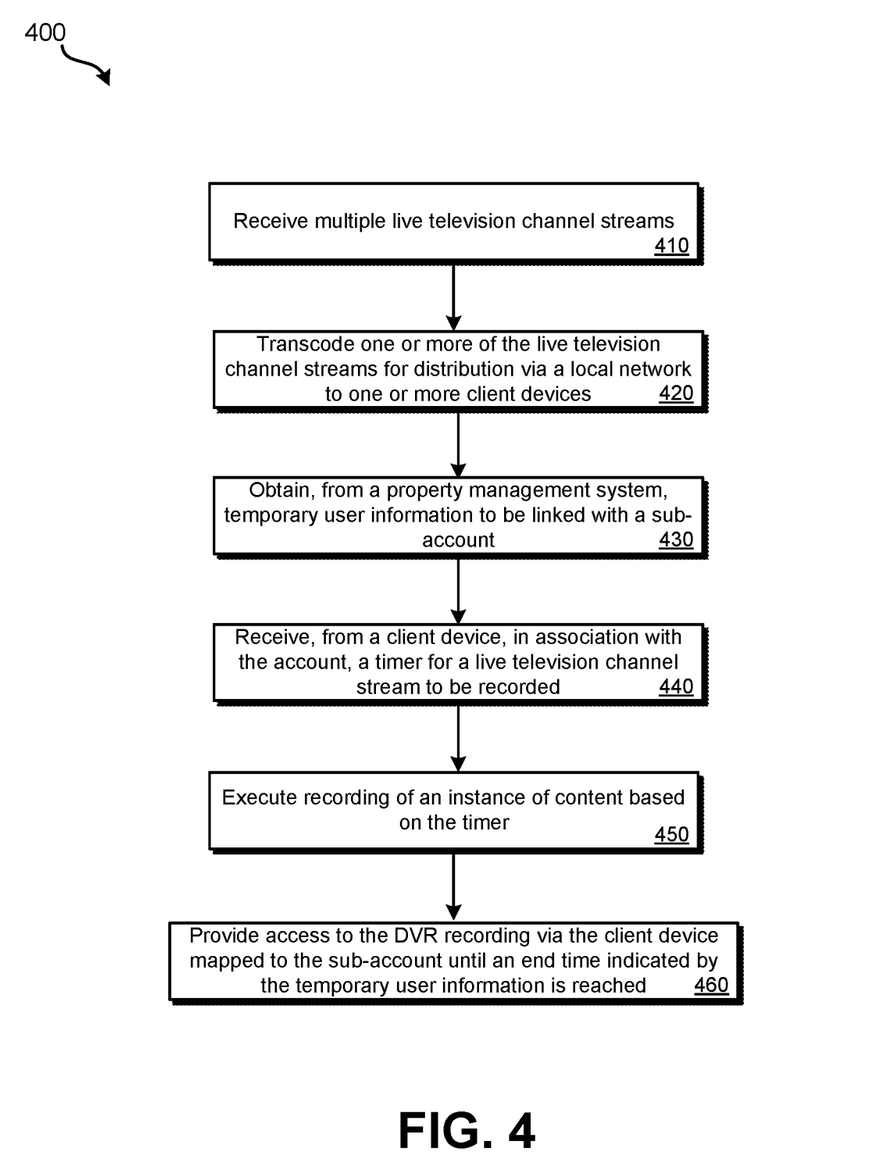
FIG. 4 illustrates an embodiment of a method for recording and providing access to digital video recorder (DVR) services.

Various methods may be performed using the systems and the devices detailed in FIGS. 1A-3. FIG. 4 illustrates an embodiment of a method for recording and providing access to digital video recorder (DVR) services. Method 400 may be performed using the systems and components of FIGS. 1A, 1B, and/or 2. Specifically, each block of method 400 may be performed using an embodiment of facility cloud host 200 of FIG. 2. At block 410, multiple live broadcast television channel streams from one or more sources (e.g., a cable network, IP network, satellite transmission system, over-the-air broadcasts) may be received. At block 420, each of the live television channel streams may be transcoded into a format appropriate for transmission via a local network (wired, wireless) to client devices. In some embodiments, a television channel is only transcoded if the specific television channel has been requested by a television receiver.

At block 430, temporary user information may be obtained from a PMS. This temporary user information can include a user's name, loyalty number, start time/date of a reservation, end time/date, room number. Additionally, an indication of an associated sub-account may be determined or received. The temporary user information may be stored as mapped to the sub-account of the client device of the room in which the user is to be staying.

At block 440, from the client device associated with the sub-account, an indication of a timer to record content may be received. The timer may indicate a time period, date, and television channel. In some embodiments, the timer is selected by the user selecting a television program from an EPG. As part of block 440, the timer may be checked against the user's end time obtained at block 430. If the timer specifies recording after the end time, the timer may not be set and the user may receive an error message indicating that the timer will not be enforced. Other factors may also determine whether the timer is set, such as the amount of storage space available for the recording and the number of other timers set (e.g., concurrent timers, total number of timers) by the user.

At block 450, assuming the timer has been set, the timer may cause the facility cloud host to record content at the date/time and channel indicated by the timer. The recorded content may be stored and mapped to the sub-account. At block 460, access may be provided to only the sub-account to access the recorded content for playback. Access to the recorded content may only be accessible until the end-time specified in the temporary user information. After this time, the recorded content may be deleted or otherwise made unavailable. In some embodiments, rather than the recorded content being available to only the user of the sub-account, other sub-accounts may be able to access the recorded content for a predefined period of time or until the end-time specified in the temporary user information is reached.

Figure 5:
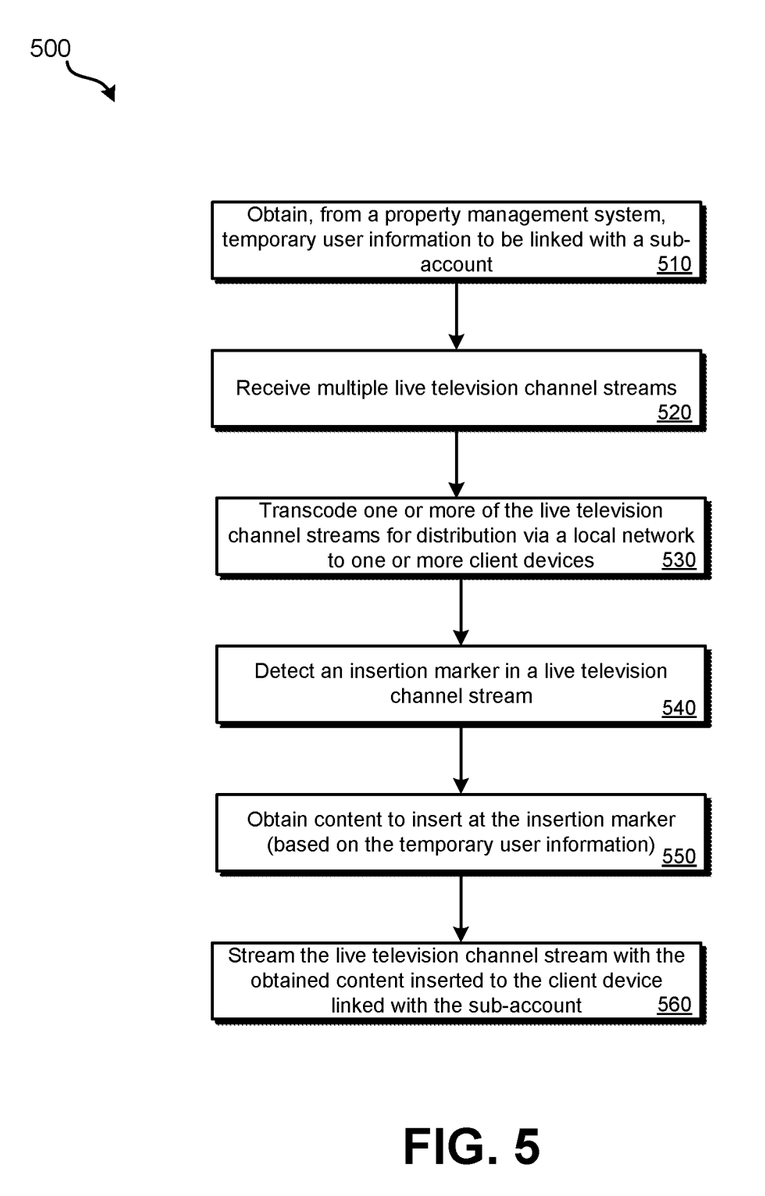
FIG. 5 illustrates an embodiment of a method for inserting content in a live television channel stream.

FIG. 5 illustrates an embodiment of a method 500 for inserting content in a live television channel stream. Method 500 may be performed using the systems and components of FIGS. 1A, 1B, and/or 2. Specifically, each block of method 500 may be performed using an embodiment of facility cloud host 200 of FIG. 2. Method 500 may be performed in addition to or instead of method 400.

At block 510, temporary user information may be obtained from a PMS. This temporary user information can include a user's name, loyalty number, start time/date of a reservation, end time/date, room number. Additionally, an indication of an associated sub-account may be determined or received. The temporary user information may be stored as mapped to the sub-account of the client device of the room in which the user is to be staying.

At block 520, multiple live broadcast television channel streams from one or more sources (e.g., a cable network, IP network, satellite transmission system, over-the-air broadcasts) may be received. At block 530, each of the live television channel streams may be transcoded into a format appropriate for transmission via a local network (wired, wireless) to client devices. In some embodiments, a television channel is only transcoded if the specific television channel has been requested by a television receiver. One of these television channels may be being streamed to a client device based on a request having been received for the television channel in association with a subaccount mapped to the client device.

At block 540, an insertion marker may be detected in a live television channel stream. In other embodiments, the insertion marker may be detected in previously-recorded or stored DVR content that is being streamed to the client device for playback. The insertion marker may indicate an amount of time available for insertion. For example, at the beginning (or before the beginning of a television commercial) an insertion marker may be present that indicates a start time, end time, and/or time period during which content is permissible to be inserted over other content present on the television channel or stored content.

Based on detecting the insertion marker, content may be obtained locally from an insertion content repository or remotely from an insertion server system at block 550. The insertion marker may be detected several seconds before the content is scheduled to be streamed to the client device. Therefore, this amount of time may be available to obtain the content to be inserted. The content obtained at block 550 may be targeted to the user based on the temporary user information obtained at block 510 from the PMS. At block 560, the television channel or stored content may be streamed to the client device with the inserted content inserted in place of other content present on the television channel or the stored content.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A local cloud system for providing television services, the local cloud system comprising:
   a facility cloud host system, comprising:
      a content service provider interface that is used to receive a plurality of live television channel streams from a television content service provider;
      a plurality of tuners, wherein each tuner of the plurality of tuners receives one or more live television channel streams of the plurality of live television channel streams;
      a transcoder that transcodes the one or more live television channels into a format to be transmitted locally to one or more client devices of a plurality of client devices, wherein:
         each client device is mapped to a subaccount of a plurality of subaccounts;
      a property management system interface through which temporary user information is imported for each subaccount of the plurality of subaccounts, wherein the temporary user information is indicative of an end time that is temporarily mapped to the subaccount; and
      a digital video recorder (DVR) that provides content recording services for the plurality of subaccounts mapped to the plurality of client devices; and
   a master cloud host that is accessible via the Internet by the facility cloud host system, wherein the facility cloud host system is configured to:
      receive, from a client device of the plurality of client devices, user credentials for an end user account maintained by the master cloud host; and
      access the master cloud host to retrieve a timer previously set for the end user account and receive permission to access a television channel otherwise unavailable through the facility cloud host system, wherein:
         the facility cloud host system records an instance of content from the plurality of live television channel streams by the DVR in association with a subaccount of the plurality of subaccounts for the client device of the plurality of client devices that are co-located at a facility location of the facility cloud host system; and
         the facility cloud host system permits access to the instance of content recorded for the subaccount via the client device until the end time is reached.

2. The local cloud system for providing television services of claim 1, wherein the temporary user information is indicative of a time period of a room reservation and a name of a person mapped to the room reservation.

3. The local cloud system for providing television services of claim 1, wherein the facility cloud host system further comprises:

a satellite antenna that is connected with the content service provider interface to receive the plurality of live television channel streams.

4. The local cloud system for providing television services of claim 3, wherein the facility cloud host system further comprises:
an over-the-air (OTA) interface that receives one or more locally-broadcast OTA television channels, wherein the transcoder converts the one or more locally-broadcast OTA television channels into the format to be transmitted locally to one or more client devices of the plurality of client devices.

5. The local cloud system for providing television services of claim 1, the local cloud system comprising:
the plurality of client devices, wherein each client device of the plurality of client devices has an installed application that communicates with the facility cloud host system.

6. The local cloud system for providing television services of claim 5, wherein the facility cloud host system is installed at a hotel and the plurality of client devices are installed in hotel rooms of the hotel.

7. The local cloud system for providing television services of claim 1, the local cloud system comprising:
the plurality of client devices, wherein each client device of the plurality of client devices is a set top box that performs bidirectional communication with the facility cloud host system.

8. The local cloud system for providing television services of claim 1, wherein the facility cloud host system further comprises a client interface that performs bidirectional communication via an IP network with the plurality of client devices.

9. The local cloud system for providing television services of claim 1, further comprising:
a property management system that tracks an end date of room reservations, wherein the plurality of client devices are located in a plurality of rooms tracked by the property management system.

10. The local cloud system for providing television services of claim 1, wherein the facility cloud host system is further configured to access, via the master cloud host, content previously-recorded in association with the end user account, wherein the content was recorded based on a second timer.

11. A method for using a local cloud system, the method comprising:
obtaining, by a facility cloud host system, from a property management system, temporary user account information to be linked with a sub-account;
receiving, using a plurality of tuners, a plurality of television channels;
transcoding the plurality of television channels into a format for transmission over a packet-based network to a plurality of client devices, wherein:
the plurality of client devices are co-located with the facility cloud host system at a facility location such that the plurality of client devices directly communicate with the facility cloud host system;
receiving, from a client device of the plurality of client devices, user credentials for an end user account maintained by a master cloud host;
transmitting, by the facility cloud host system, the user credentials to the master cloud host;
receiving, by the facility cloud host system, a digital video recorder (DVR) timer previously set for the end user account from the master cloud host;
performing, by the facility cloud host system, recording of a live television channel stream based on the timer received from the master cloud host in accordance with the sub-account; and
providing access to the recording of the live television channel stream for the sub-account for a time period defined based at least in part on the temporary user account information.

12. The method for using the local cloud system of claim 11, wherein the temporary user account information is indicative of the time period of a room reservation and a name of a person mapped to the room reservation.

13. The method for using the local cloud system of claim 11, wherein receiving the plurality of television channels comprises receiving at least one television channel via an over-the-air (OTA) antenna.

14. The method for using the local cloud system of claim 13, wherein receiving the plurality of television channels comprises receiving at least one television channel via a satellite antenna.

15. The method for using the local cloud system of claim 11, wherein the definition of the DVR timer is received from a smart television executing an application that is configured to communicate with the facility cloud host system.

16. The method for using the local cloud system of claim 11, wherein the facility cloud host system is installed at a hotel and the plurality of client devices are installed in hotel rooms of the hotel.

17. The method for using the local cloud system of claim 11, further comprising:
mirroring, by the facility cloud host system, data stored at a master cloud system such that the data is additionally available at the facility cloud host system.

18. The method for using the local cloud system of claim 11, further comprising:
performing, by the facility cloud host system, a plurality of recordings of a plurality of live television channel streams based on a plurality of timers defined by a television service provider.

19. The method for using the local cloud system of claim 11, further comprising:
retrieving, by the facility cloud host system, previously-recorded DVR content from the master cloud host via the Internet based on the user credentials for the end user account of a user of a client device linked with the sub-account.

* * * * *